United States Patent

[11] 3,626,978

| [72] | Inventor | Herman M. Hoekstra<br>South Bend, Ind. |
|------|----------|----------------------------------------|
| [21] | Appl. No. | 32,017 |
| [22] | Filed | Apr. 27, 1970 |
| [45] | Patented | Dec. 14, 1971 |
| [73] | Assignee | The Bendix Corporation |

[54] CHECK VALVE
7 Claims, 4 Drawing Figs.

[52] U.S. Cl. ..................................................... 137/525.3, 29/157.1
[51] Int. Cl. ..................................................... F16k 15/14
[50] Field of Search .......................................... 137/512, 512.3, 516.11, 516.13, 516.15, 516.17, 516.19, 516.21, 516.23, 525, 525.1, 525.3; 303/4, 31; 29/157.1

[56] References Cited
UNITED STATES PATENTS

| 3,033,230 | 5/1962 | Brand | 137/525 X |
| 3,059,637 | 10/1962 | Senne | 137/525 X |
| 3,228,418 | 1/1966 | Rosback et al. | 137/525 X |
| 3,465,786 | 9/1969 | Spisak | 137/525.3 X |
| 3,507,586 | 4/1970 | Gronemeyer et al. | 137/525.3 X |

*Primary Examiner*—Samuel B. Rothberg
*Assistant Examiner*—David J. Zobkiw
*Attorneys*—William N. Antonis and Plante, Hartz, Smith and Thompson ABSTRACT: A support member preventing extrusion of a cap member from an opening in the housing of a check valve.

PATENTED DEC 14 1971 3,626,978

INVENTOR.
HERMAN M. HOEKSTRA

BY Plante, Hartz, Smith
& Thompson
ATTORNEYS

CHECK VALVE

BACKGROUND OF THE INVENTION

This invention relates to an improved check valve for use in a power brake system.

In modern cars, because of the Federal Highway Safety Standard requirements, all engines are equipped with smog devices to reduce air pollution. In tuning such an engine to operate at a level of efficiency and because of added components, such as air conditioning, the temperature under the hood has risen considerably in the past few years. This is especially noted upon restarting a recently stopped engine because the cooling system does not operate to carry away any heat. If the valves of the vehicle are not tuned properly with this increase in under the hood temperature, it is possible for fuel vapor to enter the piston chamber when the engine is stopped. Now upon restarting, it is possible that the engine may backfire through the manifold causing a high internal back pressure in the vacuum system. A one-way plastic check valve in the brake system prevents this back pressure from causing damage to the power booster. These plastic check valves are constructed of two pieces which snap together, but due to heat expansion and a sudden surge of back pressure snap apart, also causing a loss of vacuum power assist in the braking system.

SUMMARY OF THE INVENTION

In the improved check valve of the present invention, support means are provided for the closure member of the housing, to withstand both expansion due to the increase in temperature and extrusion forces resulting from any internal back pressure.

It is therefore an object of this invention to provide means for retaining a closure member in the housing of a check valve to thereby prevent loss of vacuum to the brake system.

It is another object of this invention to provide a check valve with support means welded to a hoop for retaining a cap in a groove which permits the separate parts to expand but prevents the cap from being extruded upon the occurrence of a high internal back pressure.

Further objects will be apparent to those of ordinary skill in the art from reading the specification in view of the drawing of the preferred embodiment.

DETAILED DESCRIPTION OF THE PREFERRED EMBODIMENT

Figure 1:
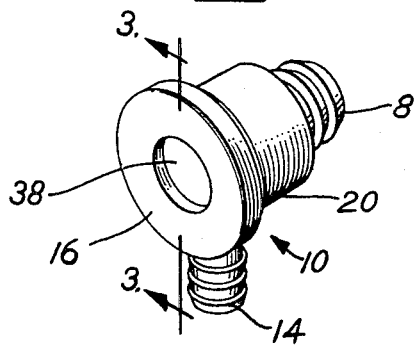
FIG. 1 is a perspective view of a check valve constructed in accordance with the principles of the present invention.
Figure 3:
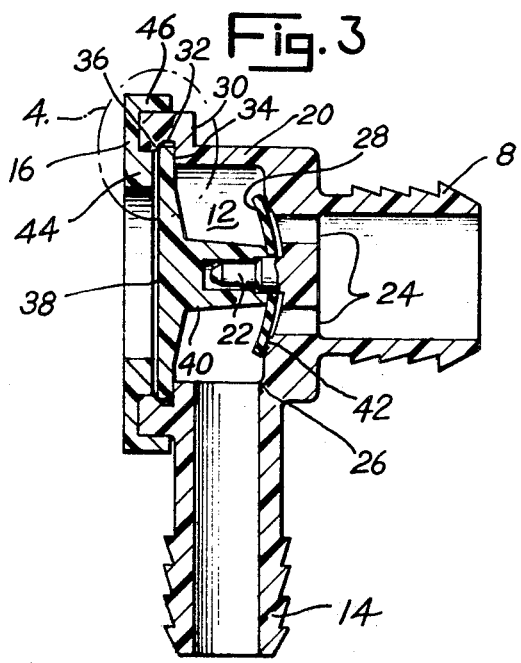
FIG. 3 is a cross-sectional view taken along line 3—3 of FIG. 1.

In the improved check valve 10, shown in FIGS. 1 and 3, means are provided to allow fluid flow through conduit 8 from a system into a control chamber 12 and out to a source of vacuum by conduit 14. Flow in the opposite direction is prevented by the flexible plate 28 which seals the opening to conduit 8. If any sudden backflow pressure in conduit 14 should now occur because of engine backfire, support means 16 is provided to retain cap 38 in the check valve body 20.

The check valve 10 consists of a housing 20 having a control chamber 12, a plurality of inlet ports 24, and an outlet port 26. The inlet ports 24 are radially spaced around a stem 22 which is integrally formed with the housing 20 and carries a flexible plate 28. An opening in the housing 20, for inserting the flexible plate 28 into chamber 12, has a shoulder or hoop 30 surrounding it.

The shoulder or hoop 30 has an internal groove 32 with one wall 34 adjacent the chamber 12 perpendicular to an axial line through the center of stem 22. The other wall 36 is tapered toward the bottom of the groove. Cap 38 retained in groove 32 has a tubular projection 40 which surrounds stem 22 for seating flexible plate 28 on wall 42.

A U-shaped support member 16 made up of concentric rings of material joined together surround shoulder member 30 providing rigidity to the structure. Internal ring 44 of the support member overlying cap 38 extends to the slope of groove 32 while external ring 46 extends to a point opposite the perpendicular wall of groove 32. This U-shaped support member permits the shoulder member 30 to act as a resilient hinge, biasing cap 38 into sealing engagement with wall 34. Support member 16 is resilient enough to permit movement of cap 38 in groove 32 due to expansion caused by heat, yet it is rigid enough to prevent extrusion of the cap 38 past internal ring 44 due to a sudden surge of back pressure through conduit 14 from the source of vacuum.

METHOD OF ASSEMBLY

Figure 2:
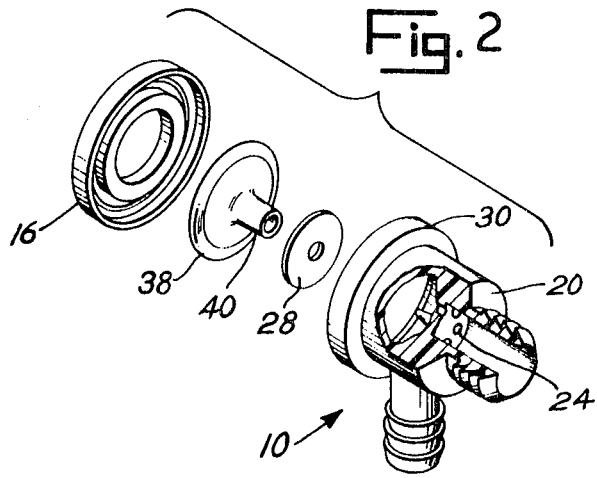
FIG. 2 is an exploded perspective view of the components of the check valve of FIG. 1.

As shown in FIG. 2, the check valve assembly consists of the following subcomponents: housing 20, cap 38, support member 16 (made of nylon in the preferred embodiment) and flexible plate 28 (made of a rubberlike material).

Housing 20 includes shoulder member 30 and stem 22 which are molded into one piece. The flexible plate 28 is placed on stem 22 through an opening in the housing 20. Next, cap 38 is aligned with stem 22 and snapped into groove 32 to form control chamber 12 in housing 20 with the flexible plate 28. The tubular projection 40 on cap 38 surrounds stem 22 and causes flexible plate 28 to assume a concave seating position on wall 42 (see FIG. 3). Support member 16 is then placed on shoulder member 30 and fixedly secured in place by either cementing, staking or welding.

In the embodiment shown in FIG. 1, the method of securing by sonic welding is preferred since it is faster.

Figure 4:
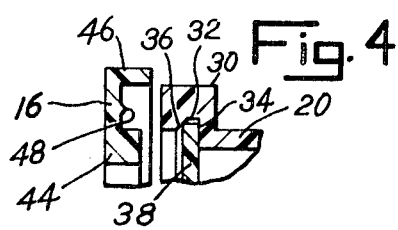
FIG. 4 is an exploded sectional view of the circumscribed portion of FIG. 3.

In sonic welding the internal molecular particles of the separate components are agitated at a high frequency causing frictional heat to mold projection 48 shown in FIG. 4 into shoulder 30 to form a unitary structure.

MODE OF OPERATION

In normal operation with the engine of a vehicle running, the check valve 10 operates as follows: vacuum from the manifold draws air from control chamber 12 through outlet port 26 via conduit 14, causing a pressure differential to occur across the concave flexible plate 28. When the pressure differential becomes large enough to unseat the flexible plate 28 from wall 42, air will flow through the plurality of passages into the control chamber 12 thereby providing the system with available vacuum to operate the power boost mechanism of the brake system.

Upon stopping the vehicle, the vacuum created at the manifold is eliminated. Without sufficient pressure differential across it, flexible plate 28 seats on wall 42 (as shown in FIG. 3) preventing backflow of fluid through the plurality of inlet ports 24. In an engine not tuned properly, there is the possibility of the engine backfiring upon restarting causing a high internal pressure to be carried through conduit 14 to the control chamber 12. Since the check valve is made of nylon, a slight expansion of body 20 occurs due to this internal pressure causing cap 38 to move along tapered wall 36 of groove 32 until abutting internal ring 44 of support member 16, which retains cap 38 in groove 32. When the back pressure subsides, the shoulder member 30 because of its resilient quality will act as a hinge and again seal cap 38 against wall 34. Thus, the system has been provided with check valve means which will not rupture because of changes in fluid flow conditions thereby assuring the power brakes of a connection to the source of vacuum.

I claim:

1. A check valve, comprising:

a housing having a valve chamber therein with inlet and outlet port means, said outlet port means being connected to a source of vacuum while said inlet port means is connected to a system;

shoulder means on said housing surrounding an opening to said valve chamber;

a flexible member in said valve chamber carried by a stem member extending from said housing, said flexible member overlying said inlet port means and seatable on a valve seat for allowing fluid from the system while preventing backflow through said inlet port means;

capping means retained by said shoulder means and having a tubular projection surrounding said stem member for seating said flexible member against said valve seat; and support means fixedly secured to said shoulder means for preventing said capping means from rupturing under a high internal back pressure from said source of vacuum.

2. A check valve, as recited in claim 1, wherein said shoulder means includes an internal groove for retaining said capping means, and said support means includes a U-shaped member surrounding said shoulder means, said U-shaped member having an internal ring which extends to said groove thereby permitting said capping means to move within said groove while preventing said capping means from being extruded from said groove by pressure in said valve chamber.

3. A check valve with a housing having a resilient hoop biasing a closure member in a groove to seal an opening in the housing, said closure member positioning a flexible member over an inlet port in the housing to form a control chamber, said flexible member permitting fluid flow through the control chamber in only one direction to an outlet port in the housing, the improvement comprising:

a support member welded to said resilient hoop adjacent said groove for preventing rupture of the seal between said closure member and the housing when a high backflow pressure is transmitted through the outlet port into said control chamber.

4. In a check valve, as recited in claim 3, wherein said support member is U-shaped and surrounds said hoop thereby providing rigidity to said hoop after said closure member is pressed in said groove while permitting said hoop to retain its biasing quality for sealing said closure member.

5. A check valve, comprising:

a housing;

a valve chamber within said housing;

a stem member integral with said housing extending into said valve chamber, said stem member being surrounded by a plurality of passages forming inlet port means from a system;

outlet port means from said chamber in communication with a source of vacuum;

a flexible member with a central opening carried by said stem member and overlying said passages;

a cap for closing an opening to said valve chamber and having a tubular projection, said tubular projection sliding over said stem member and positioning said flexible member in a concave position against said passages for permitting the flow of fluid pressure in only one direction;

a resilient shoulder surrounding said opening to said valve chamber, said resilient shoulder having an internal groove with one wall tapered for biasing said cap toward the other wall to seal said opening; and support means welded to said shoulder adjacent said tapered wall for permitting said cap to move in said groove while preventing extrusion of said cap from said groove upon the occurrence of a high internal back pressure through said outlet from said source of fluid pressure.

6. The check valve, as recited in claim 5, wherein said support means includes a U-shaped member formed by concentric rings of material joined together for encasing said shoulder to form an integral structure.

7. The check valve, as recited in claim 6, wherein said U-shaped member permits said shoulder to act as a hinge for biasing said cap into a sealing position.